United States Patent
Borja

(10) Patent No.: US 6,330,961 B1
(45) Date of Patent: Dec. 18, 2001

(54) FOREARM MOUNTED STORAGE POUCH FOR SECURING ARTICLES AND UTILIZING A PERSONAL COMMUNICATOR

(76) Inventor: Anita Arriola Borja, 32133 Bayberry Rd., Wildomar, CA (US) 92595

( * ) Notice: Subject to any disclaimer, the term of this patent is extended or adjusted under 35 U.S.C. 154(b) by 0 days.

(21) Appl. No.: 09/549,421

(22) Filed: Apr. 15, 2000

(51) Int. Cl.[7] .................................................. A45C 13/30
(52) U.S. Cl. .......................... 224/222; 224/221; 224/267; 224/901.4; 224/930
(58) Field of Search ................................. 224/219, 221, 224/222, 267, 901.2, 901.4, 930

(56) References Cited

U.S. PATENT DOCUMENTS

| | | | |
|---|---|---|---|
| D. 249,592 | * | 9/1978 | Libonati .............................. D3/106 X |
| D. 323,939 | * | 2/1992 | Mok ....................................... D3/106 |
| 2,881,441 | * | 4/1959 | Bass .................................. 224/219 X |
| 4,746,043 | * | 5/1988 | Booker ................................... 224/219 |
| 4,988,097 | * | 1/1991 | Smith et al. ........................... 272/119 |
| 5,228,012 | * | 7/1993 | Seager ..................................... 368/10 |
| 5,235,560 | * | 8/1993 | Seager ..................................... 368/10 |
| 5,309,328 | * | 5/1994 | Lum ....................................... 361/809 |
| 5,657,201 | * | 8/1997 | Kochls .................................. 361/686 |

* cited by examiner

*Primary Examiner*—Stephen K. Cronin
(74) *Attorney, Agent, or Firm*—Robert Nathans

(57) ABSTRACT

An elongated pouch having various storage pockets thereon is provided, for storage of personal articles therein, and is mounted upon a forearm of a user of the pouch such as the driver of an automobile. A personnel communicator device is positioned within the pouch, the personnel communicator device having a data transmission portion, typically a keyboard and a character display screen, facing the driver of the vehicle for facilitating data exchange between the driver and the personnel communicator device while operating the vehicle. The screen generated characters are displayed along a line parallel to the length of the forearm of the driver of the vehicle to facilitate easy reading of the characters by the driver of the vehicle.

16 Claims, 1 Drawing Sheet

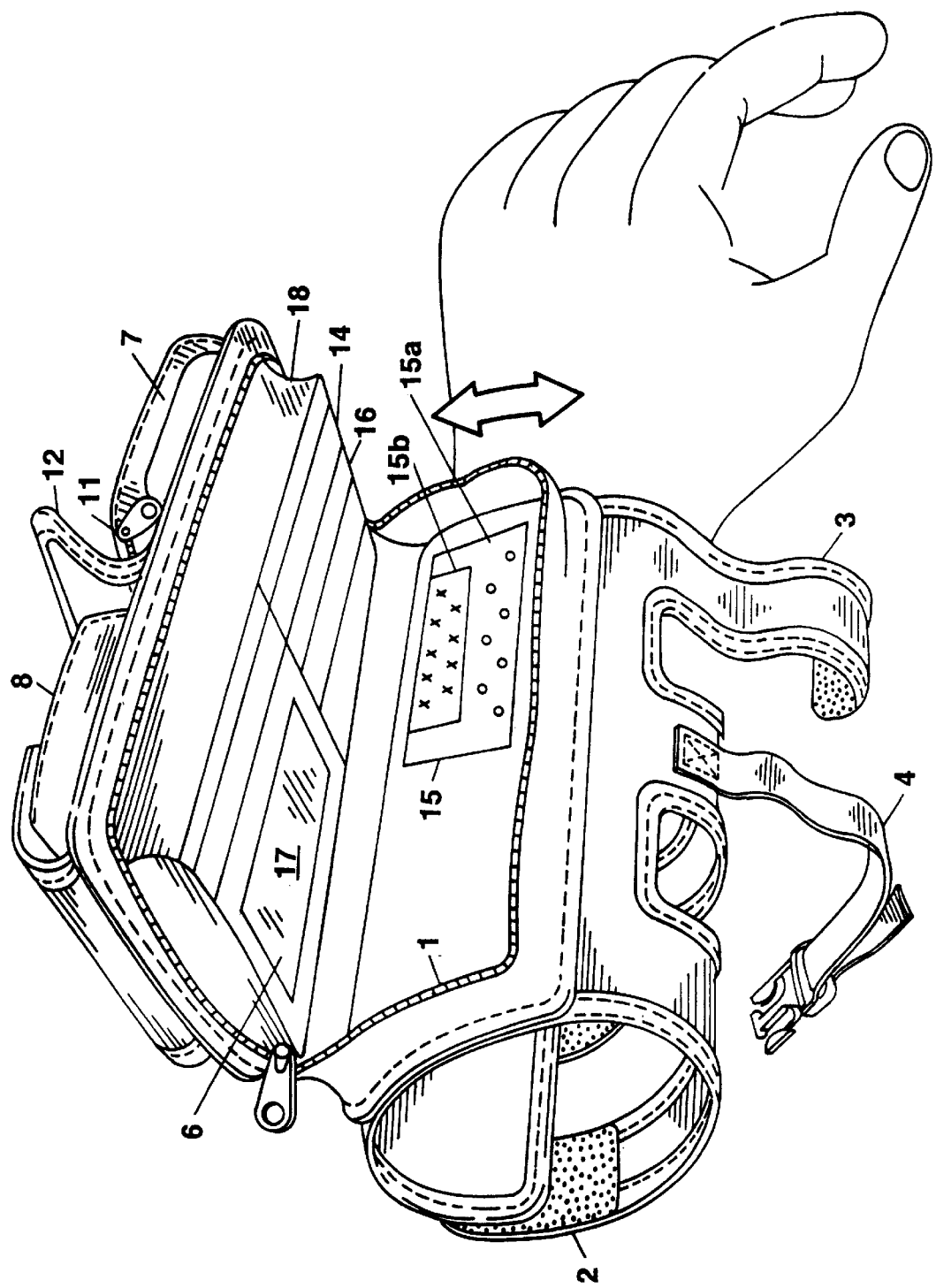

FOREARM MOUNTED STORAGE POUCH FOR SECURING ARTICLES AND UTILIZING A PERSONAL COMMUNICATOR

BACKGROUND OF THE INVENTION

The present invention relates to the field of pouches for containing personal articles.

U.S. Pat. No. 4,128,194 issued to Hinz discloses a body mounted pouch for carrying various items such as eyeglasses, wallets, credit cards which are not easily carried in a trouser pocket, which pocket is often not even present in a woman's outfit. U.S. Pat No. 3,678,977 issued to Baumgartner states that a ladies "overarm carrying bag" is provided "which serves the purpose of a lady's handbag, a shopping bag or a travel bag and wherein there are provided a series of different pockets each of which is adapted for a particular use." Thus the teaching of a number of bulky article containing pouches e.g. shopping bag or pocket book, mechanically hanging from the forearm of the user is suggested by the last mentioned prior art patent. The items in these bulky pouches can be readily snatched by a thief and in any event are not compatable to quick and easy visual access by the driver of a vehicle, typically an automobile, operating a personal communicator, which is an important objective of the present invention.

Quick and easy access to a number of personal articles carried by a person, with a relatively enhanced degree of security, is desired. Pockets, when available, or pocketbooks provide fairly rapid access but the articles therein are not secure. Articles in pockets can be easily lost or stolen. Pocketbooks are often snatched from the owner by a thief The ubiquitous money belt provides substantial security against snatching but access is limited to retrieve articles.

SUMMARY OF PREFERRED EMBODIMENTS OF THE INVENTION

Thus, convenient, rapid, easy and relatively secure access to personal articles, often not present in prior art article storage devices, is met by the present invention, which employs an elongated pouch, with one or more smaller pouches secured thereon, mounted directly over an upper forearm of the owner of the personal articles. Also rapid easy visual access to the stored personal items is desired to drivers of cars such as commuters who spend much time driving to and from work. Likewise with respect to operators of motorcycles, boats and aircraft. Also, operators of such vehicles desire rapid and easy access to a cell phone and visual data displayed by a display screen of a personnel communicator. Thus a driver desires to readily view data displayed by a personnel communicator device close to the operator's eyes and ears. Also, he or she should be able to readily access a miniature keyboard while the vehicle is stopped.

BRIEF DESCRIPTION OF THE DRAWING

Various features of the invention will become more apparent upon study of the following description, taken in conjunction with the sole FIGURE illustrating a preferred embodiment of the invention.

DETAILED DESCRIPTION OF PREFERRED EMBODIMENTS OF THE INVENTION

It is thus desired to provide a method of storing a variety of personal articles in a pouch which has a fairly good resistance to being stolen by being snatched from the user, and yet provides quick and easy access to the articles therein.

Accordingly, while the pouch of the present invention could be used to contain practically any easily accessed items e.g. school supplies used by school children, female cosmetics, credit cards etc. and which would be substantially protected against loss or theft while being worn, a particularly important use of the pouch would be to contain a personal communicator, such as a cellular phone or small palm sized computer having a display screen coupled to the internet via radio link.

In these personal communicator devices, a character display screen can display stock quotes, e-mail messages, the weather, driving direction instructions etc. to the driver. A cell phone-computer combination with a display screen such the Nokia 7100 could be employed. Or a 5 oz. pager sized personal communicator could be mounted within the horizontal forearm mounted pouch having a display screen displaying alpha-numeric characters such as e-mail messages, stock quotes, the weather or the like. For these types of devices, see BARRONS Feb 28, 2000 page 34; note the size and configuration of the RIM Blackberry which would fit into the arm pouch nicely. Since the display screen would be close to the head of the driver, incoming information (displayed characters) is more safely displayed relative to a dashboard mounted display and the driver can easily operate the computer keyboard (e-mail or phone) in effect mounted on the users forearm. Also, importantly, the operation of the cell phone is hands-free for safer driving. Besides use in automobiles, the arrangement could also be used advantageously by motor cyclists, flyers, boat operators, bikers, skiers, hikers etc. A wide customer market is thus provided. In addition, the horizontal pouch near the driver's head could also conveniently contain a sandwich for lunching while driving. Time is indeed limited for ambitious working folks today.

Referring now to the sole FIGURE, an elongated pouch 1 is affixed to the upper forearm portion of the body of the user by hook and eye type "Velcro" fastener straps 2 and 3, and optionally via an additional adjustable security strap 4. The elongated pouch 1 is closed by a fastener 6 such as a zipper, for retaining personal articles within pouch 1. Optionally, additional smaller storage pockets 7 and 8 may be formed upon the elongated pouch 1 and have associated fasteners for retaining articles within the pockets. Preferably, pocket 7 has an associated zipper 11 covered over by a hook and eye flap 12, while pocket 8 may also have such a fastener arrangement. Other pockets may be provided with or without article retention fasteners such as pockets 14, 16 and 17, handy for storing credit cards, drivers licenses etc. An open pocket 18 may be provided for larger articles.

As shown in the sole FIGURE, the aforesaid personal communicator 15, typically having a keyboard 15a, is illustrated within the storage pouch and may be secured herein by any means such as conventional hook and eye surfaces on the rear of the communicator. The display screen 15b of the communicator, palm computer or cellular phone, is preferably of a type that is elongated substantially parallel to the forearm as shown, so that the characters xxx are easily read by the driver of the vehicle. One such item is the RIM Blackberry communicator mentioned above. The pouch area 1 can of course contain if desired other personal items, conveniently accessed by a driver of a vehicle or other user. Even a snack for lunch, anti-acid tablets, wallet etc. can be made readily available.

Thus the preferred method of utilizing the pouch while driving a motor vehicle includes providing an elongated pouch I including first zipper fastening means 6 for enabling storage of personal articles therein and second strap fastening means 3, 4, for mounting the elongated pouch upon a forearm of a user of the pouch; positioning a personnel communicator device 15 within the elongated pouch, the personnel communicator device having a data transmission portion, keyboard 15a and/or character display screen 15b, facing the driver of the vehicle during operation of the vehicle; and mounting the elongated pouch directly upon and over an upper forearm body portion of the driver for facilitating data exchange between the driver and the personnel communicator device while operating the vehicle.

Also, the personal communicator device via screen 15b, preferably displays characters along a given line and wherein the personal communicator device is positioned within the pouch so that the character display line xxx is substantially parallel to the length of the forearm body portion of the user as shown to facilitate easy reading of the characters by the driver of the vehicle.

Since variations of the foregoing will occur to workers in the art, the scope of the invention is to be restricted solely by the terms of the following claims and art recognized equivalents thereof For example, the term "data transmission portion" of the personal communicator is intended to include a character display screen, a small keyboard, a telephone voice receiver or transmitter or other data transducer for exchanging data to and from the communicator or vehicle. The receiver and microphone transmitter of a cell phone could be a head mounted unit if desired, in view of vehicle noise.

I claim:

1. Method of facilitating safe use of a personnel communicator by a driver of a vehicle while driving comprising the steps of:
   (a) mounting a pouch upon a forearm of said driver of a vehicle;
   (b) providing a personal communicator for transmitting data to a distant communication center separated from said vehicle via a wireless communication link and for relaying received data from the distant communication center to the driver of said vehicle via a wireless communication link; and
   (c) inserting said personal communicator within said pouch at a position close to said driver's eyes and ears, enabling said driver to readily perceive said received data made available to said driver by said personnel communicator.

2. Method of claim 1 wherein said personal communicator is selected from the group consisting of cellular telephones, and small palm sized computers internet coupled via said wireless communication link.

3. Method of claim 1 including visually displaying said received data.

4. Method of claim 3 wherein said personal communicator is selected from the group consisting of cellular telephones, and small palm sized computers internet coupled via said wireless communication link.

5. Method of claim 3 wherein the step of visually displaying said received data includes generating lines of characters substantially parallel to the length of said forearm of the driver of said vehicle.

6. Method of claim 5 wherein said personal communicator is selected from the group consisting of cellular telephones, and small palm sized computers internet coupled via said wireless communication link.

7. Method of facilitating safe use of a personnel communicator by a driver of a vehicle while driving comprising the steps of:
   (a) providing a personal communicator for transmitting data to a distant communication center separated from said vehicle via a wireless communication link and for receiving data from the distant communication center to the driver of said vehicle via a wireless communication link;
   (b) mounting a pouch upon a forearm portion of the body of the driver of said motor vehicle;
   (c) inserting said personal communicator in said pouch at a position close to the driver's eyes and ears, enabling said driver to readily perceive said received data made available to said driver by said personnel communicator.

8. Method of claim 7 wherein said personal communicator is selected from the group consisting of cellular telephones, and small palm sized computers internet coupled via said wireless communication link.

9. Method of claim 7 including visually displaying said received data by a personal communicator display screen.

10. Method of claim 9 wherein said personal communicator is selected from the group consisting of celfular telephones, and small palm sized computers internet coupled via said wireless communirtion link.

11. Method of claim 9 wherein the step of visually displaying said received data includes generating lines of characters substantially parallel to the length of said forearm portion of the driver of said vehicle.

12. Method of claim 11 wherein said personal communicator is selected from the group consisting of celular telephones, and small palm sized computers internet coupled via said wireless communication link.

13. Method of facilitating safe use of a personnel communicator by a driver of a vehicle while driving comprising the steps of:
   (a) mounting a pouch for containing various personal articles upon a forearm of said driver of a vehicle;
   (b) providing a personal communicator selected from the group consisting of a cellular telephone and a small internet computer, said personal communicator designed to transmit data to a distant communication center, separated from said vehicle via a wireless communication link, and for visually displaying said received data by a personal communicator display screen;
   (c) inserting said personal communicator within said pouch at a position close to said driver's eyes and ears, enabling said driver to visually perceive said received data made available to said driver by said personnel communicator; and
   (d) inserting various personal articles along with said personal communicator into said pouch.

14. Method of claim 13 wherein said personal communicator is selected from the group consisting of cellular telephones, and small palm sized computers internet coupled via said wireless communication link.

15. Method of claim 13 wherein the step of visually displaying said received data includes generating lines of characters substantially parallel to the length of said forearm of the driver of said vehicle.

16. Method of claim 15 wherein said personal communicator is selected from the group consisting of cellular telephones, and small palm sized computers internet coupled via said wireless communication link.

* * * * *